United States Patent [19]
Vogg et al.

[11] Patent Number: 5,302,065
[45] Date of Patent: Apr. 12, 1994

[54] LOCKING DEVICE FOR SECURING A COMPONENT TO A RAIL, ESPECIALLY IN AN AIRCRAFT

[75] Inventors: Guenter Vogg; Juergen Wieck, both of Bremen, Fed. Rep. of Germany

[73] Assignee: Deutsche Aerospace Airubs GmbH, Hamburg, Fed. Rep. of Germany

[21] Appl. No.: 48,826

[22] Filed: Apr. 16, 1993

[30] Foreign Application Priority Data

Apr. 16, 1992 [DE] Fed. Rep. of Germany ....... 4212694

[51] Int. Cl.⁵ .................. F16B 21/00; F16B 27/00
[52] U.S. Cl. ................................. 411/85; 411/107; 411/553
[58] Field of Search .............. 411/84, 85, 107, 349, 411/549, 551, 552, 553

[56] References Cited

U.S. PATENT DOCUMENTS

| | | | |
|---|---|---|---|
| 1,933,536 | 11/1933 | Awbrey | 411/85 X |
| 1,985,333 | 12/1934 | Wiley | 411/107 |
| 2,163,446 | 6/1939 | Heckman | 411/85 X |
| 2,859,057 | 11/1958 | Elsner | 411/85 X |
| 4,784,554 | 11/1988 | Break | 411/85 X |
| 5,076,748 | 12/1991 | Waterfield et al. | 411/551 |

*Primary Examiner*—Neill R. Wilson
*Attorney, Agent, or Firm*—W. G. Fasse

[57] ABSTRACT

A locking device for securing a component, such as a seating frame to a floor, for example, in an aircraft, includes a locking bolt, one end of which is provided with a locking cross-head, having two projections that engage under rail rims of a support rail in the floor. The other end of the bolt is provided with a threading that cooperates with a nut for providing the required clamping force. At least two alignment guide studs are so positioned that the locking bolt is oriented intermediate the two studs. These studs fit into respective recesses in the rail for properly locating the locking device. A carrier member of the locking device may be a separate base plate or it my be part of the seating frame structure. A slot, at the visible end of the locking bolt, is so oriented, that it indicates the locked or unlocked condition of the locking bolt. The slot also serves for inserting a tool to bring the cross-head with its projections into the locked position and to then hold the bolt for tightening or loosening the nut.

15 Claims, 3 Drawing Sheets

LOCKING DEVICE FOR SECURING A COMPONENT TO A RAIL, ESPECIALLY IN AN AIRCRAFT

FIELD OF THE INVENTION

The invention relates to a locking device that is used for securing a component, such as a row of chairs to a floor, for example in an aircraft. The device permits a rapid attachment and removal of the component, for example to a rail structure in the floor.

BACKGROUND INFORMATION

A floor that divides a passenger cabin from a cargo hold in an aircraft is equipped with support rails which are secured in the floor. The support rails are accessible from above by the locking device. Such locking devices include at least one locking element, that is rotatable in a carrier and has at least one projection for lockingly engaging the support rail, more specifically a locking rim of the support rail.

Such devices are used, for example, to secure seating structures or other equipment to the floor in a passenger cabin of an aircraft. However, such locking devices are not limited to the just given example. The devices may also be used, as another example for securing components, such as room dividers, in a cargo hold of an aircraft. Such room dividers are secured to respective rails in the floor of the cargo hold. However, conventional devices of this type leave room for improvement, since these devices do not permit a simple and rapid operation of the locking devices, for example, for changing a seating arrangement. Further, the operational locking devices are not especially compact and leave room for improvement with regard to securing such components in all three directions of space in a three-dimensional coordinate system having coordinates X, Y and Z.

OBJECTS OF THE INVENTION

In view of the foregoing it is the aim of the invention to achieve the following objects singly or in combination:

to provide a locking device of the type described above that is universally useful for the intended purpose and easily as well as rapidly operable;

to construct such a locking device in a compact manner, yet to make sure that it provides a secure locking;

to provide such a locking device with guide studs that assure a proper orientation of the locking device relative to support rails in a floor; and to provide such a locking device with an indicator that shows to the operator the orientation of a locking projection that is not visible, once the projection has been inserted into the support rail.

SUMMARY OF THE INVENTION

The above objects have been achieved according to the invention by the combination of the following features. The locking element is constructed as a bolt passing rotatably through a hole in a carrier member. The upwardly extending end of the bolt above the hole in the carrier member is provided with a clamping mechanism preferably in the form of a threading that cooperates with a clamping nut. The lower end of the bolt is provided with a cross-head having at least one, preferably two projections that extend laterally away from the bolt in a cantilever manner for engaging a rail rim in a support rail in a locking manner. The locking bolt is positioned between two alignment guide studs forming together with the bolt a row that aligns the locking device with the longitudinal extension of the support rail. The alignment guide studs have an on-center spacing that matches an on-center spacing between neighboring recesses in the rail rims so that the studs can fit into these recesses, thereby properly orienting the locking device relative to the rail.

The combination of the bolt with the cross-head and the cross-head projections makes it possible to provide a secure locking by a rotational movement of the bolt through a 90° angle, whereby the projections reach under the cantilevered rail rim or rims. Such a locking, especially when two cantilevered rails rims are engaged by two oppositely extending cross-head projections, assures that any tilting in a direction crosswise to the length of the support rail is prevented. The two alignment guide studs, engaging the recesses in the rail, make sure that a tilting in the lengthwise direction of the support rail is prevented. The cooperation of the threaded end of the locking bolt with a locking nut makes sure that a proper clamping action can be applied after the bolt itself has been rotated into its locking position. Once the nut is tightened it is not possible for the bolt to return into its unlocked position in an unintended manner. The just described features make sure that a locking is obtained in the X and Y direction by the simple 90° rotation of the bolt and a further locking is assured in the Z direction by tightening the clamping nut. The recesses in the rail rims are, as mentioned, spaced from one another with an on-center spacing that is, for example, measured in inches and uniform along the length of the rail, so that the locking devices can be repositioned with measured spacings from previous positions. These spacings may be provided as a so-called inch raster that correlates the recesses in neighboring rails in the floor.

In order to provide a compact structure, it is preferable that the alignment guide studs have lateral indentations facing the locking bolt, whereby the projection or projections of the locking cross-head are received in these indentations when the cross-head is in the unlocked position, whereby the guide studs and the bolt can be positioned closer together. Further, it is preferable to provide a limit stop at each end of the respective indentation for positively defining an unlocked position of the locking head projections.

The above mentioned support rail has a gap between its rail rims. Such a gap has a standardized width and the locking head, according to the invention, has a width slightly smaller than the gap width for a convenient insertion of the locking head into the gap prior to turning the locking bolt into its locked position.

In a preferred embodiment the component and the locking device or rather the carrier member each have at least one, preferably two alignment holes off-center relative to the central longitudinal axis of the locking device. An alignment pin passes through each pair of holes for orienting the locking device relative to the support rail and relative to the component to be installed on the floor.

In another embodiment two locking bolts are positioned between two neighboring alignment guide studs, of which there are three in this embodiment. The two locking bolts and the three guide studs are arranged in a row in alternate fashion and the row is aligned relative to the support rail. In all embodiments the carrier member for the locking device could be a part of the bottom frame structure of the component to be installed on the floor.

Where the carrier member is a separate element, it is formed as a plate that extends substantially in parallel to the downwardly facing frame structure or the like of the component to be installed. In this embodiment, the frame structure is merely provided with holes for passing the locking bolt through the frame structure and through respective holes in the separate carrier member. Additional holes may be provided for the above mentioned arresting pins to properly orient the locking device relative to the support rail and relative to the component frame to be secured to the support rail.

The present locking device may be used by installing it as part of the component frame structure prior to the installation of the components in the aircraft or the locking device may be kept on hand separately and attached at the time of installing the components in the aircraft. In both instances the locking head with its crosswise projection or projections will be locked with the support rail. Where the locking device is first installed in the support rail, the components, such as seating frames are merely set with their holes onto the locking bolts and tightening of the nuts completes the installation.

The upwardly facing end face of the locking bolt is provided with a recess for the insertion of a tool, such as a screw driver or hex key to hold the bolt in the locked position while tightening the nut. A slot for a screw driver will preferably be so oriented that it indicates the locked condition and the unlocked condition of the locking bolt, the head of which is recessed in the rail.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
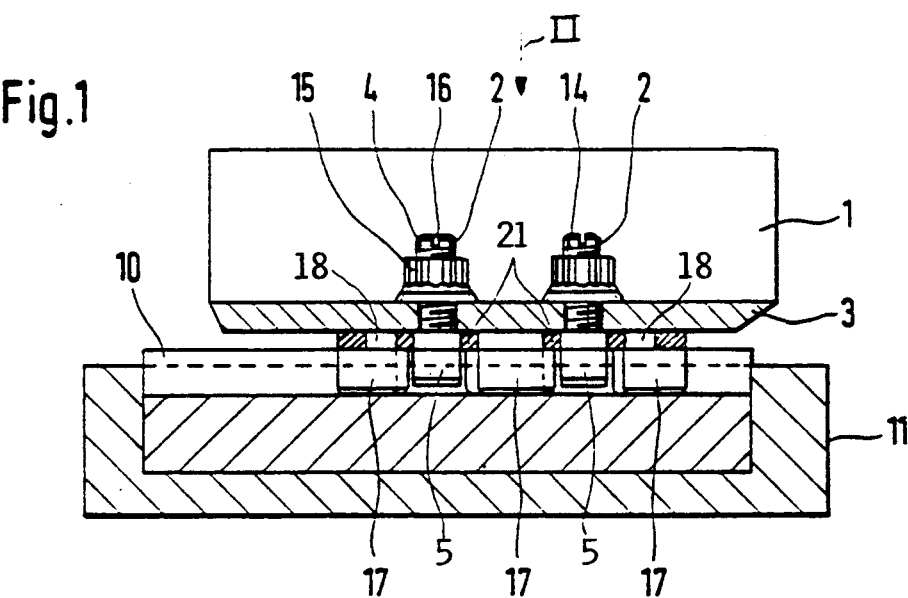
FIG. 1 is a sectional view of a first embodiment of a locking device according to the invention with two locking bolts and three alignment guide studs arranged in a row.
Figure 2:
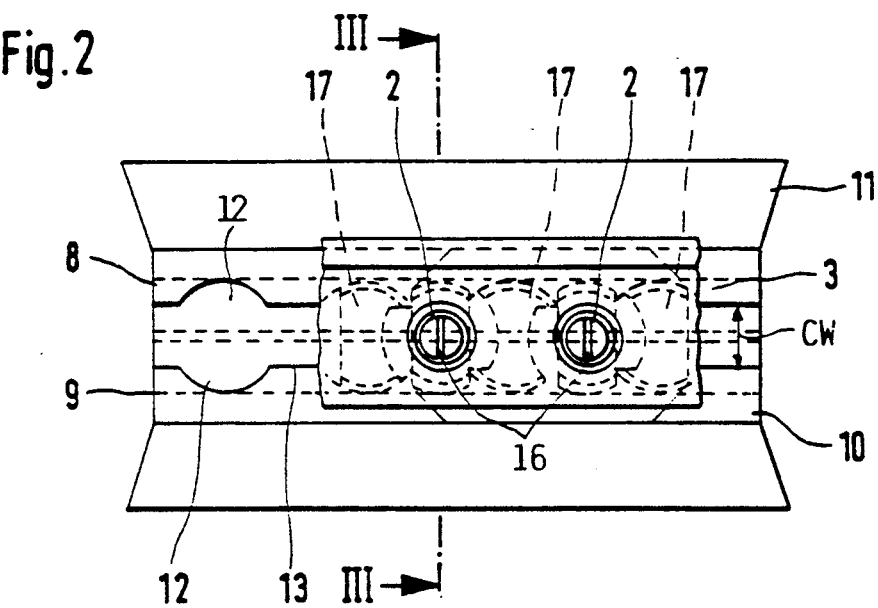
FIG. 2 is a view in the direction of the arrow II in FIG. 1.
Figure 3:
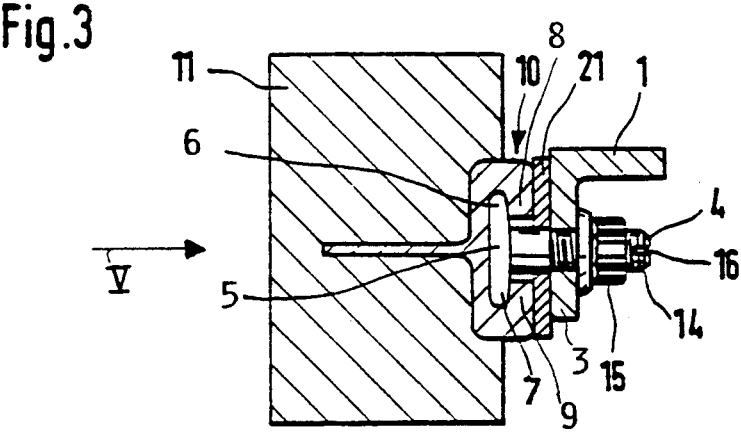
FIG. 3 is a sectional view along section line III—III in FIG. 2.

FIGS. 1 to 5 show an embodiment of the present locking device with two locking bolts 2 and three alignment guide studs 17 arranged in a row, as best seen in FIGS. 1 and 2, for securing a component, such as the base frame 1 of a row of seats in an aircraft, of which only the floor 11 and a guide rail 10 are shown. A carrier member 3 forms part of the locking device on the one hand and part of the component 1 on the other hand. The carrier member 3 is, for example, an L-angular section, as best seen in FIG. 3. The carrier member 3 may, however, be independent of the component 1 or the carrier member may form a base plate 21 with through hole through which the locking bolts 2 extend in a rotatable manner and with three alignment guide studs 17, as shown. In other words, the carrier member may either be a part 3 of the component 1 or it may be a base plate 21, or the part 3 and the base plate 21 are an integral one-piece element.

Figure 4:
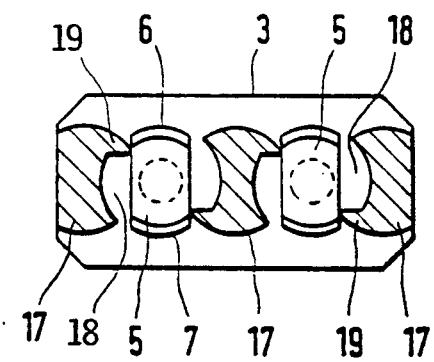
FIG. 4 is a bottom view onto the present locking device with the rail and floor removed to illustrate the position of the locking head projections in the locked condition.
Figure 5:
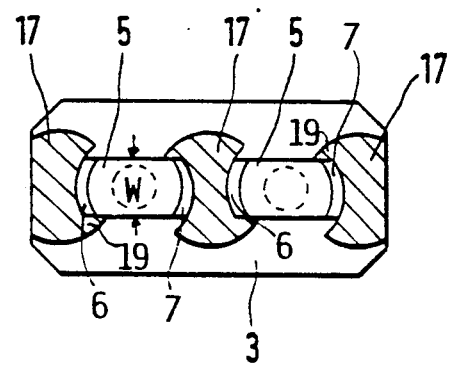
FIG. 5 is a view similar to that of FIG. 4 in the direction of the arrow V in FIG. 3 with the floor and support rail removed to illustrate the locking head projections in the unlocked condition.
Figure 6:
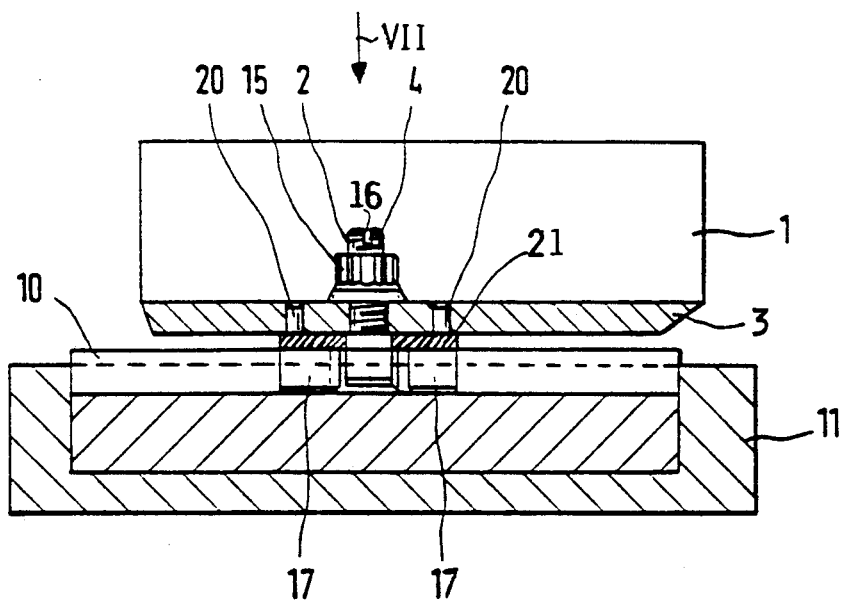
FIG. 6 is a sectional view similar to that of FIG. 1 but showing a locking device with one locking bolt and two alignment guide studs.
Figure 7:
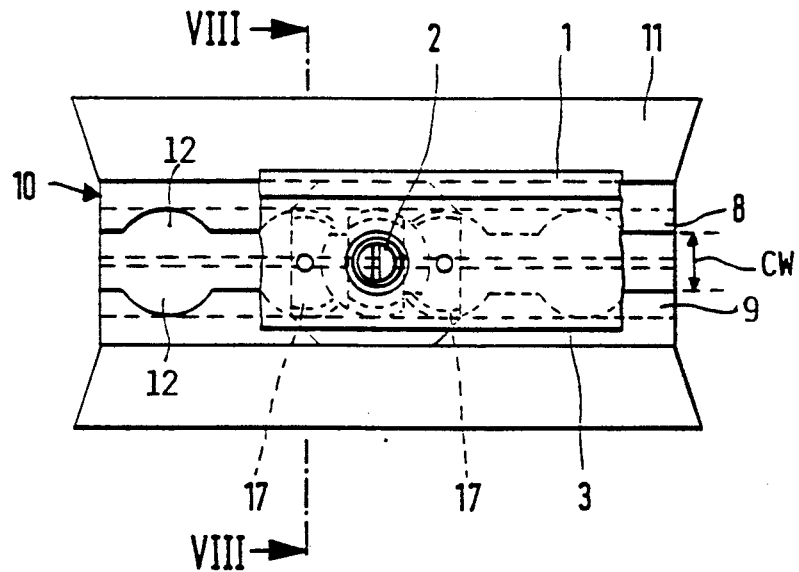
FIG. 7 is a top plan view in the direction of the arrow VII in FIG. 6.
Figure 8:
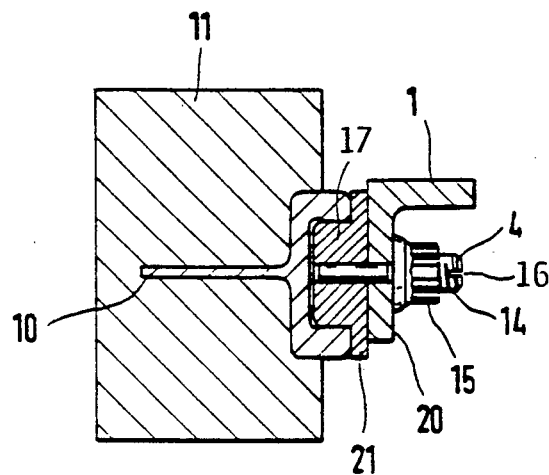
FIG. 8 is a sectional view along section line VIII—VIII in FIG. 7.
Figure 9:
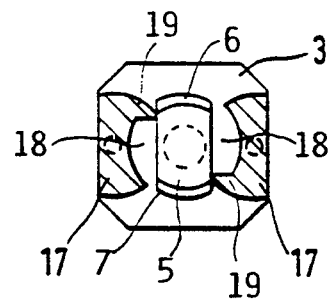
FIG. 9 is a bottom view of the locking device of FIG. 6 illustrating the locked position of the cross-head projections.
Figure 10:
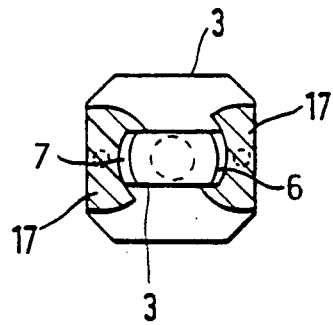
FIG. 10 is a view similar to that of FIG. 9, but showing the unlocked condition of the cross-head projections.

The locking bolt 2 comprises a first threaded end 14 and a second end with a locking cross-head 5. As best seen in FIGS. 4 and 5, the locking cross-head 5 has at least one, preferably two projections 6 and 7 extending away from the bolt 2 in opposite directions. These projections 6 and 7 extend longitudinally relative to the longitudinal axis of the rail 10, when the locking bolts are in the unlocked condition. FIG. 3 shows the locked condition, wherein the projections 6 and 7 reach under and lock against rail rims 8 and 9, that cantilever toward each other across a longitudinal groove or channel 13 in the rail 10. The rail rims 8 and 9 are provided with recesses 12, for example, in the form of circular segments. These recesses 12 have an on-center spacing from one another along the length of the rail 10 which is uniform for all rails and preferably standardized for the insertion of the alignment guide studs 17 into these recesses 12. Neighboring recesses 12 are interconnected by portions of the central groove 13. Two recesses 12 together form a substantially circular opening for receiving the above mentioned alignment guide studs 17. The circular openings are wider than the channel sections 13 interconnecting neighboring circular openings formed by two opposite recesses 12. Further, the channel width CW shown in FIG. 2 and formed by the rail rims 8 and 9 facing each other outside the circular openings is slightly larger than the width W of the locking cross-heads 5, please see FIG. 5. Thus, these cross-heads are easily inserted into the channels, when the locking cross-heads 5 are in the unlocked condition shown in FIG. 5.

In order to provide the necessary clamping or locking force, the external threading 14 of the locking bolt 2 cooperates with a locking nut 15. Additionally, the upwardly facing end surface 4 of the bolt 2 is provided with a recess 16 for the insertion of a tool, such as a screw driver, to first turn the bolt 2 through 90° to bring the projections 6 and 7 into the locked condition shown in FIG. 3 and to then hold the bolt in that position, until the nut is tightened. The recess 16 is preferably a slot which is oriented as shown in the drawings, to thereby indicate the locked condition or the unlocked condition. When the slot is aligned with the longitudinal axis of the rail 10, the bolt is in the unlocked condition. When the slot 16 extends crosswise to the length of the rail, the bolt is in the locked position.

The above mentioned alignment guide studs 17 extend substantially in parallel to the bolt 2. The on-center spacing between two neighboring alignment studs 17 corresponds to the above mentioned on-center spacing between two openings formed by the recesses 12.

Referring to FIGS. 4 and 5, the studs 17 are preferably provided with indentations 18, in which the projections 6 and 7 are received when the bolt is unlocked, as shown in FIG. 5. Preferably stops 19 limit the rotational movement of the bolts into the indentations 18. FIG. 5 shows the function of the stops 19.

FIGS. 6 to 10 illustrate an embodiment with one locking bolt 2 and two alignment guide studs 17. In order to prevent a relative rotation between the carrier members 3 and the locking device, prior to insertion of the guide studs 17 into the rail 10, holes are provided in the carrier member and arresting pins 20 reach into these holes. These pins may be an integral part of the base plate 21 or they may be separate elements that extend into holes in the base plate 21 and into holes in member 3.

The weight of the locking device may be reduced by making the diameter of the stud 17 substantially smaller than the substantially circular openings formed by the recesses 12. It has been found to be sufficient to make the diameter of the studs 17 just slightly larger than the radius of the openings formed by the recesses 12 to provide a proper guiding of the locking device into the channel in the rail and a proper fixing and orientation of the locking device in two neighboring openings.

In operation, when the locking device is part of the seating frame, the entire frame of a row is set down, so that the guide studs 17 enter into the openings provided by the recesses 12. Then a screw driver is inserted into the slot 16 and the proper turn is made to interlock the projections 6 and 7 below the rail rims 8 and 9. This interlocking provides an arresting in the X and Y direction. The bolt 2 is then held with the screw driver against rotation and the nut 15 is tightened, thereby also providing an arresting in the Z direction. Thus, once the studs 17 are properly located in the respective openings, no further shifting in the length direction of the rail 10 takes place. The removal takes place in the same way, except the just enumerated steps are performed in the reverse order.

Although the invention has been described with reference to specific example embodiments, it will be appreciated that it is intended to cover all modifications and equivalents within the scope of the appended claims.

What we claim is:

1. A locking device for securing a component to a floor, especially in an aircraft, comprising a support rail secured to said floor, said support rail comprising a rail channel extending longitudinally in said support rail, at least one locking rail rim (8 or 9) cantilevered over part of said rail channel to form a longitudinal rail gap along said rail rim (8 or 9) in said support rail, and recesses (12) in said rail rim spaced by an on-center spacing between neighboring recesses, said locking device further comprising a carrier member (3) connected to said component, at least one locking bolt (4) including a threading (14) at one end and a locking cross-head (5) at an opposite end of said locking bolt (4), said locking cross-head having at least one projection (6,7) for engaging said rail rim, at least two alignment guide studs (17) secured to said carrier member with said on-center spacing for fitting into said recesses in said rail rim, said locking bolt (4) passing rotatably through said carrier member (3) between said two alignment guide studs with said locking cross-head (5) extending below said carrier member and said threading (14) extending above said carrier member, said locking device further comprising a threaded member for engaging said threading (14) to provide a locking force.

2. The locking device of claim 1, wherein each of said alignment guide studs (17) comprises a lateral indentation (18) facing said projection (6,7) of said locking cross-head (5), said cross-head projection (6,7) fitting into said lateral indentation when said cross-head is in an unlocked position.

3. The locking device of claim 2, wherein each of said alignment guide studs (17) comprises a stop(19) next to said indentation for engaging said cross-head projection (6,7) to limit rotation of said locking belt.

4. The locking device of claim 1, wherein said locking cross-head has a width (W) smaller than a width of said rail channel (CW).

5. The locking device of claim 1, wherein said component has at least one first alignment hole, wherein said carrier member has at least one second alignment hole off-center relative to a central longitudinal axis of said locking device, and an alignment pin passing through said first and second alignment holes for orienting said locking device relative to said support rail and relative to the component.

6. The locking device of claim 1, comprising three alignment guide studs and two locking bolts, each locking bolt being arranged between two alignment guide studs.

7. The locking device of claim 1, wherein said carrier member forms part of a bottom support structure of said component.

8. The locking device of claim 1, wherein said carrier member comprises a base plate (21) extending substantially parallel to a bottom support of said component.

9. The locking device of claim 1, wherein said opposite end of said locking bolt (4) has an end face with a recess for inserting a tool.

10. The locking device of claim 9, wherein said recess is a slot (16) for the insertion of a screw driver, said slot extending in the same direction as said projection (6,7) of said locking bolt, whereby said slot provides information regarding the orientation of said projection (6,7) when said projection is not visible in said rail channel.

11. The locking device of claim 1, wherein said support rail has two rail rims and said locking cross-head has two projections extending in opposite directions for engaging said rail rims in a locked condition.

12. A locking device for securing a component to a floor, especially in an aircraft, comprising a carrier member (3) connected to said component, at least one locking bolt (4) passing through a hole in said carrier member, said locking bolt having a first end extending above said carrier member and a second end extending below said carrier member, said first end comprising clamping means for tightening said locking bolt against said carrier member, said second end comprising a cross-head with at least one projection (6,7) for engaging a recess in said floor, and at least two alignment guide studs (17) secured to said carrier member and facing said floor for aligning said locking device, said locking bolt being positioned between said at least two alignment guide studs.

13. The locking device of claim 12, wherein said clamping means comprise a threading along said first bolt end and a threaded nut for engaging said threading.

14. The locking device of claim 12, wherein said first bolt end has an end face with a recess in said end face for inserting a tool into said recess.

15. The locking device of claim 14, wherein said recess is a slot (16) for the insertion of a screw driver, said slot extending in the same direction as said projection (6,7) of said locking bolt, whereby said slot provides information regarding the orientation of said projection (6,7) when said projection is not visible in said rail channel.

* * * * *

UNITED STATES PATENT AND TRADEMARK OFFICE
CERTIFICATE OF CORRECTION

PATENT NO. : 5,302,065

DATED : April 12, 1994

INVENTOR(S) : Vogg et al.

It is certified that error appears in the above-identified patent and that said Letters Patent is hereby corrected as shown below:

On the title page, [73] Assignee, please correct the information to read:

--Deutsche Aerospace Airbus, GmbH
      Hamburg, Fed. Rep. of Germany--

Signed and Sealed this

Second Day of August, 1994

Attest:

BRUCE LEHMAN

*Attesting Officer*      *Commissioner of Patents and Trademarks*